United States Patent
Vulich et al.

(10) Patent No.: US 10,270,670 B2
(45) Date of Patent: Apr. 23, 2019

(54) ERROR AND SPECIAL CASE HANDLING USING CLOUD ACCOUNT

(71) Applicant: SAP Portals Israel Ltd., Ra'Anana (IL)

(72) Inventors: Yan Vulich, Kiryat Ono (IL); Eyal Nathan, Ruet (IL)

(73) Assignee: SAP Portals Israel Ltd., Ra'Anana (IL)

( * ) Notice: Subject to any disclaimer, the term of this patent is extended or adjusted under 35 U.S.C. 154(b) by 370 days.

(21) Appl. No.: 14/943,987

(22) Filed: Nov. 17, 2015

(65) Prior Publication Data

US 2017/0141953 A1    May 18, 2017

(51) Int. Cl.
*G06F 15/173* (2006.01)
*H04L 12/24* (2006.01)
*H04L 29/08* (2006.01)
*H04L 29/14* (2006.01)

(52) U.S. Cl.
CPC ...... *H04L 41/5061* (2013.01); *H04L 67/1014* (2013.01); *H04L 67/1034* (2013.01); *H04L 67/2814* (2013.01); *H04L 69/40* (2013.01); *H04L 67/18* (2013.01)

(58) Field of Classification Search
CPC .. H04L 47/125; H04L 63/0263; H04L 67/146
See application file for complete search history.

(56) References Cited

U.S. PATENT DOCUMENTS

| | | | |
|---|---|---|---|
| 2007/0192246 A1* | 8/2007 | Futamase | G06F 17/30887 705/40 |
| 2014/0075239 A1* | 3/2014 | Prathipati | H04L 29/14 714/4.1 |
| 2015/0121462 A1* | 4/2015 | Courage | H04L 63/08 726/4 |
| 2016/0301758 A1* | 10/2016 | Said | H04L 67/1002 |

* cited by examiner

*Primary Examiner* — Tauqir Hussain
(74) *Attorney, Agent, or Firm* — Schwegman Lundberg & Woessner, P.A.

(57) ABSTRACT

In an example embodiment, a method of redirecting responses from an application server in a cloud environment is provided. A request is received from an instance of an application operating on a client device. The request is forwarded to an application server corresponding to the application. A generic error message from the application server sent in response to the user request is intercepted and the generic error message is redirected to a special application server hosting a special account established for the application, the special account indicating one or more actions to take in response to receipt of a generic error message, the one or more actions causing generation of a special error message and sending of the special error message to the instance of the application operating on the client device.

18 Claims, 7 Drawing Sheets

ERROR AND SPECIAL CASE HANDLING USING CLOUD ACCOUNT

TECHNICAL FIELD

This document generally relates to systems and methods for use with cloud computing accounts. More specifically, this document relates to methods and systems for error and special case handling using a cloud account.

BACKGROUND

In a cloud application environment, a cloud server enables data and/or states of an instance of an application to be stored at a different location than the instance of the application is installed or the device on which it executes. Typically, a centralized storage mechanism is used that stores data and/or application states for a number of different users (also called tenants) simultaneously. In order for the data for each user/tenant to be secure, typically each user/account is isolated, in that data from one user or tenant is not accessible by another user or tenant, even when data for both users/tenants are stored in the same storage device.

A user running a cloud application may run the application through a browser environment, and thus actions taken within the application result in calls to one or more web pages. Sometimes when a user performs an action within the application the result is a standard browser error, similar to when a website cannot be found (e.g., error 404 or error 503). This can occur for a variety of different reasons. Sometimes the function attempting to be performed has been taken offline by the provider for servicing. Sometimes the connection between the browser and the web page provider is down. Additionally, it is common for providers of applications running in a cloud to provide trial accounts (e.g., 30 day trial) to new user. After these accounts expire, the various web pages launched by particular actions within the application are inaccessible, and thus return the standard browser error.

Such errors are very uninformative and confusing to end users. Users are unable to determine the reason behind the error and, more specifically, are unable to determine whether the reason is something they can remedy (e.g., trial period has expired) or something they cannot (e.g., web page has been taken down temporarily for servicing).

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, errors or special cases are detected from application server responses in a cloud environment. A special account previously established with the application server is then used to generate a specialized response to a user based on the application server responses. Thus, rather than the application server responses, which may be generic messages, being sent to a client device operated by a user, a specialized response can be sent that indicates the nature of the error or special case.

Figure 1:
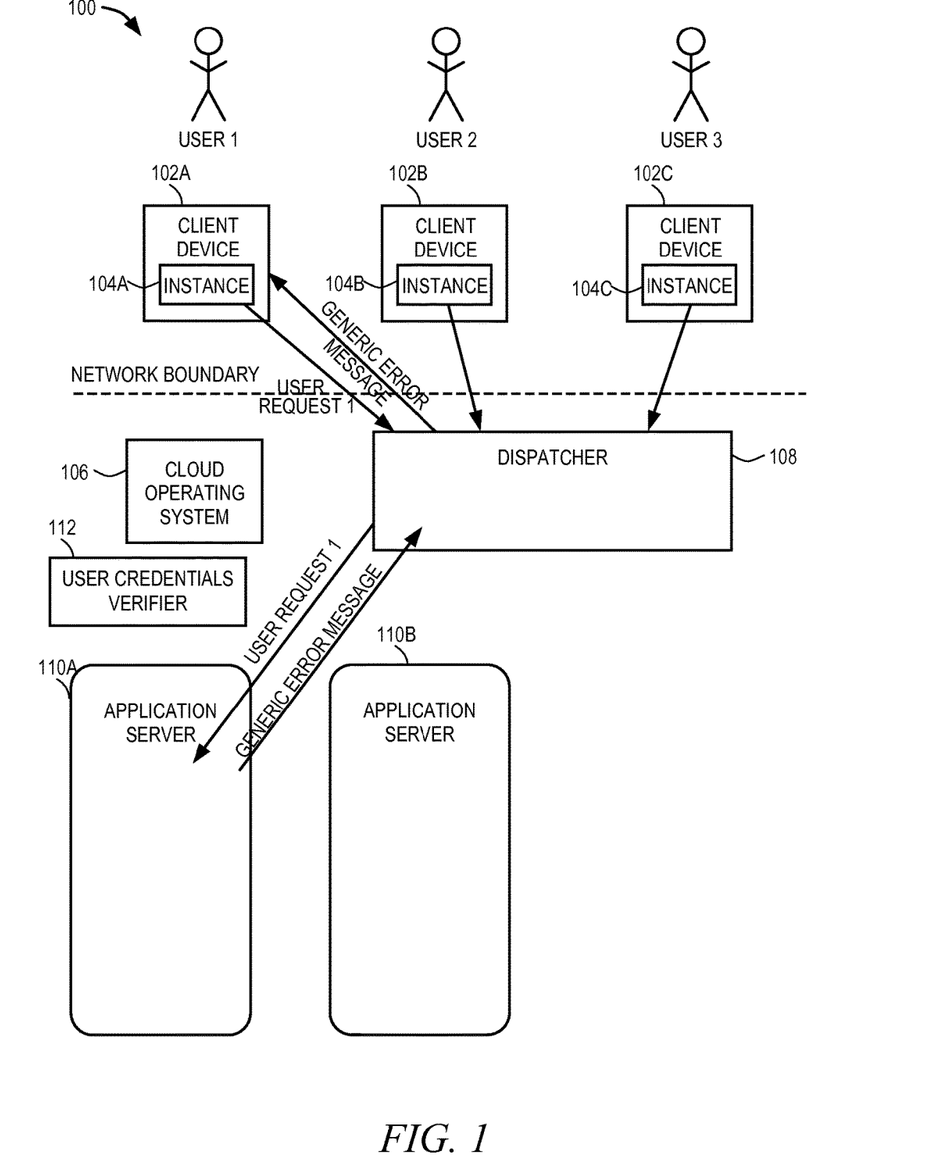
FIG. 1 is a block diagram illustrating a system, in accordance with an example embodiment, for enabling cloud-based applications.

FIG. 1 is a block diagram illustrating a system 100, in accordance with an example embodiment, for enabling cloud-based applications. The system 100 includes one or more client devices 102A-102C, each of which may run an instance 104A-104C of an application.

In order to extend an application in the cloud, a cloud operating system 106 may operate a dispatcher 108 to dispatch requests from the various instances 104A-104C of applications among multiple application servers 110A-110C. It should be noted that, even though the requests themselves are generated by the various instances 104A-104C of the applications running on the client devices 102A-102C, these requests are still known as user requests as they often occur in response to some sort of user interaction with an instance 104A-104C of the application. In some example embodiments, the various instances 104A-104C may be integrated into other applications, such as browsers, or embedded in an operating system.

Each application server 110A-110B may operate server-side functionality for an application. In some example embodiments, multiple application servers 110A-110B may provide server-side functionality for the same application, allowing for load balancing and redundancy among the appropriate application servers 110A-110B. In other example embodiments, multiple application servers 110A-110B may service instances 104A-104B of different applications. In some example embodiments, a combination of redundant application servers 110A-110B and individualized application servers 110A-110B are used. Thus, the dispatcher 108 may distribute user requests based upon the underlying application instances 104A-104B from which they were generated and/or based on one or more load balancing techniques.

Regardless of how the dispatcher 108 chooses to dispatch a user request, eventually the user request winds up being sent to an application server 110A-110B. For example, in FIG. 1, user request 1 is sent to application server 110A. Typically, the application server 110A would then service the user request. If the application server 110A requires user credentials (e.g., user name and password, if a subscription-based model), then a cloud-based user credentials verifier 112 verifies that the user credentials provided are valid. If not (e.g., if a trial subscription has expired, or the user has not renewed a paid subscription, both of which may result in deletion of the account), then when the user request is passed to the application server 110A, an error message is returned. In many cases, this error message is merely a generic error message indicating that the requested action (e.g., visiting a particular web page) cannot be performed. The result is that the user is unaware of the reasons why the action cannot be performed.

While an application server 110A-110B can be designed to generate a more specific message, application servers 110A-110B are often designed and maintained by application providers, which can often be different entities than the entity designing and maintaining the cloud environment. Thus, whether or not a particular application server 110A provides specific error messages or generic error messages is often outside of the control of the cloud operator.

Figure 2:
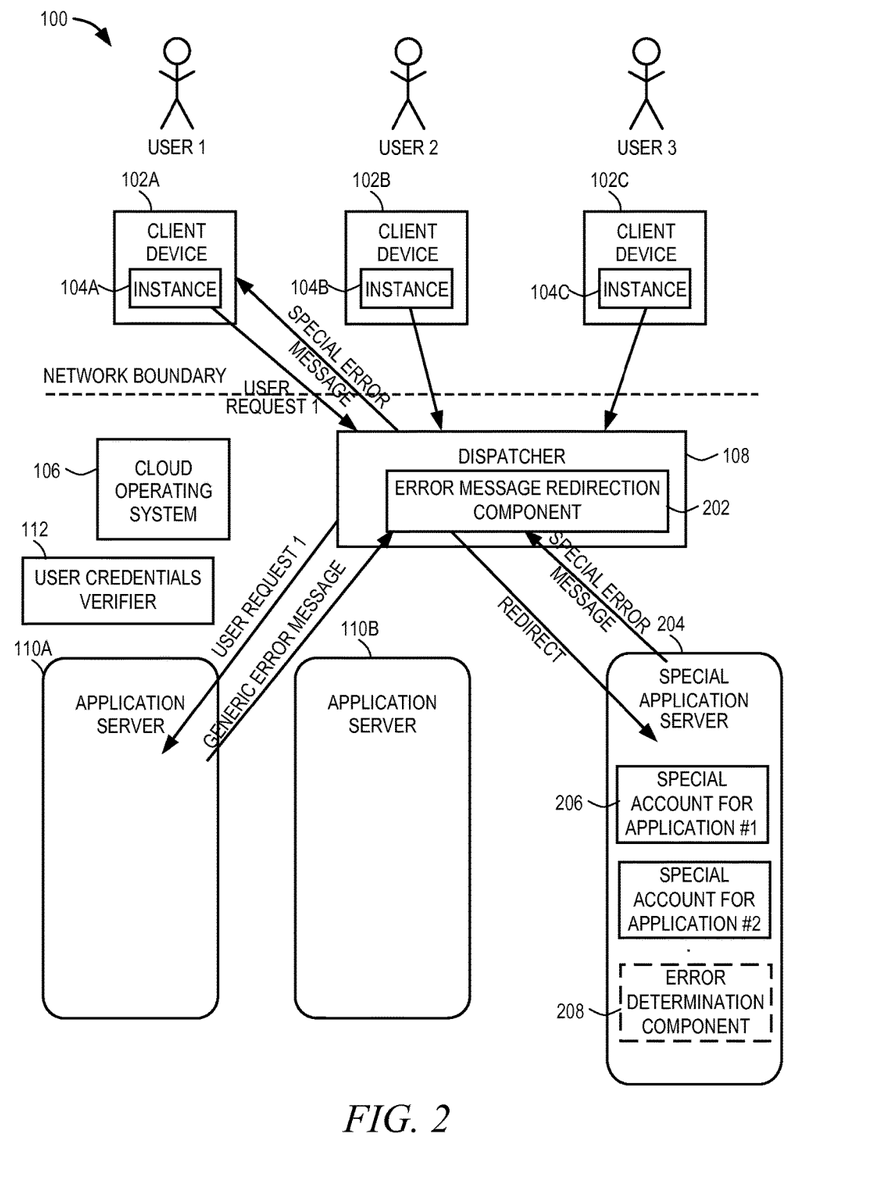
FIG. 2 is a block diagram illustrating a modified system, in accordance with another example embodiment, for enabling cloud-based applications.

FIG. 2 is a block diagram illustrating a modified system 100, in accordance with another example embodiment, for enabling cloud-based applications. The modified system 100 is similar to system 100 of FIG. 1, except that the dispatcher 108 has been modified to include an error message redirection component 202 and the modified system 100 now includes a special application server 204. Additionally, an additional account is added for the application running on the application server 110A, which will be called the "special account" 206. In an example embodiment, a separate special account 206 is set up for each application in the cloud. As will be seen, this allows an administrator to set up different error messages or error message handling on an application-by-application basis.

In this example embodiment, when a generic error message is generated by the application server 110A, the error message redirection component 202 intercepts the generic error message and redirects it to the special application server 204. This redirection may include whatever information that the error message redirection component 202 has regarding the generic error message including, for example, information about the application server 110A that sent the generic error message, a uniform resource locator (URL) that was attempted to be accessed when the generic error message was sent, any metadata received with the error message, packet information sent with the generic error message, etc.

At the special application server 204, the information sent with the redirection is used to identify the particular special account 206 to utilize. Since each special account 206 corresponds to a different application, the information about which application server 110A-110B sent the generic error message may be highly useful in determining which special account 206 to utilize.

The special account 206 specifies one or more actions to take in response to the receipt of the redirection. The actions taken can vary depend ending upon implementation and the amount of information passed to the special application server 204 during the redirection. In some instances, for example, the special application server 204 may know nothing more than that the generic error message was generated by an attempt to access a particular URL on a particular application server 110A-110B. In such an instance, the special account 206 may specify an error message that represents the error message with the highest likelihood of being accurate. This may often be that the user credentials could not be verified, but may not always be the case. For example, if the application server 110A or other cloud environment component is under maintenance, an administrator may temporarily alter the actions specified in the special account 206 to indicate that the action is unable to be performed due to system maintenance. In other words, the administrator can make the special account 206 generate any message to his or her liking and may change that message at any time. Because the special account 206 is unique to the application, the result is that the administrator can set different messages for different applications. Thus, if, for example, a first application is under maintenance while a second application is not under maintenance, then the special account 206 associated with the first application may be modified so that it generates a special message indicating that the action cannot be performed due to system maintenance while the special account 206 associated with the second application may be modified so that it generates a special message indicating that the action cannot be performed because the user credentials cannot be validated.

In another example embodiment, the special account 206 may specify a set of rules which, when executed, determine which of a plurality of different special error messages to generate and send. These rules may utilize, for example, the information from the error message redirection component 202 (e.g., metadata). Additionally, the error message redirection component 202 may be further modified to gather additional information that may be useful to the rules. For example, the error message redirection component 202 could monitor and parse the user requests themselves to determine what the user was attempting to do when the error message occurred. This may be useful in determining what type of error message to generate. Java or other parameters generated by or through the processing of these user requests can also be gathered and used in this determination. In a further example embodiment, the special application server 204 includes an error determination component 208 that acts to perform the analysis of all the available data (e.g., parameters, metadata, etc.) and determine what the root reason for the error was. This information is then used by the special account 206 in determining a special error message to send.

In an example embodiment, the error message redirection component 202 can be selectively activated by the instance 104A-104C of the application running on the client device 102A-102C. This may be performed, for example, through the use of a cookie stored on the client device 102A-102C that is passed by the instance 104A-104C along with any requests that may be redirected if necessary. The cookie may contain the location of the special application server 204. When the dispatcher 108 encounters a user request with the cookie, it is signaled to intercept and examine the response to the user request from the application server 100A and redirect a generic error message to the location specified in the cookie. The cookie may also indicate any parameters, data, metadata, or other information that should be captured and sent along with the redirect to the special application server 204.

Figure 3:
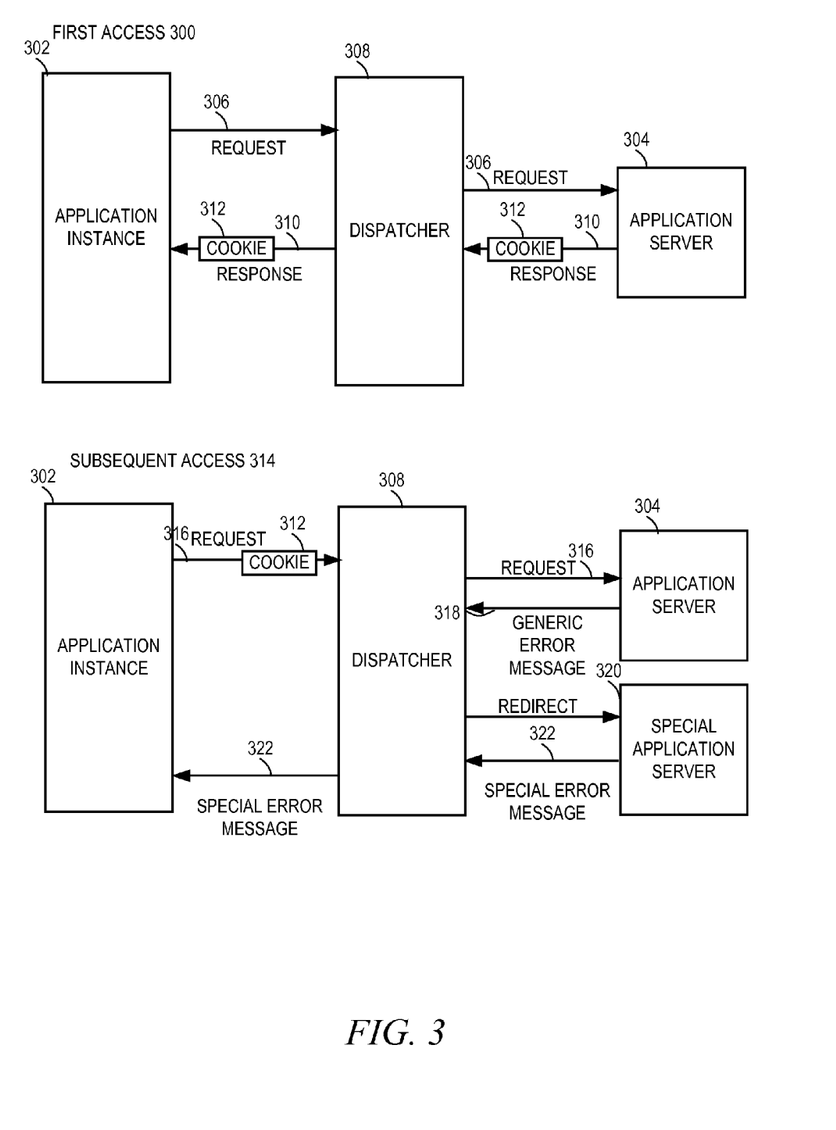
FIG. 3 is an interaction diagram illustrating a method, in accordance with an example embodiment, of establishing and utilizing a cookie for error message redirection.

In an example embodiment, the cookie may be passed to the client device 102A-102C from the application server 110A upon the first time the corresponding instance 104A-104C accesses the application server 110A. FIG. 3 is an interaction diagram illustrating a method, in accordance with an example embodiment, of establishing and utilizing a cookie for error message redirection. Here, process 300 indicates a process that occurs upon a first access by an instance 302 to an application server 304. A request 306 is passed to the dispatcher 308, which passes the request 306 to the application server 304. The application server 304 then processes the request 306 and generates a response 310. The response 310 includes the cookie 312, as described earlier. The dispatcher 308 then forwards the response 310 and cookie 312 to the instance 302, which stores the cookie 312 locally, e.g., in a local nonvolatile memory.

Later, as depicted at process 314, when a subsequent user request 316 is generated by the instance 302, the cookie 312 is included with the subsequent user request. Upon receiving this, the dispatcher 308 records the user request 316 that included the cookie 312 and stores the cookie 312 temporarily. Then it waits for a response 318 to the user request 316 to be received. Once the dispatcher 308 receives this response 318, it determines if the response 318 is a generic error message and, if so, redirects the error message and whatever other information may be useful (such as information it gathered or stored when detecting the cookie 312) to the location specified in the cookie 312 which, in this case, is special application server 320, which generates a special error message 322 that is then forwarded to the instance 302.

Figure 4:
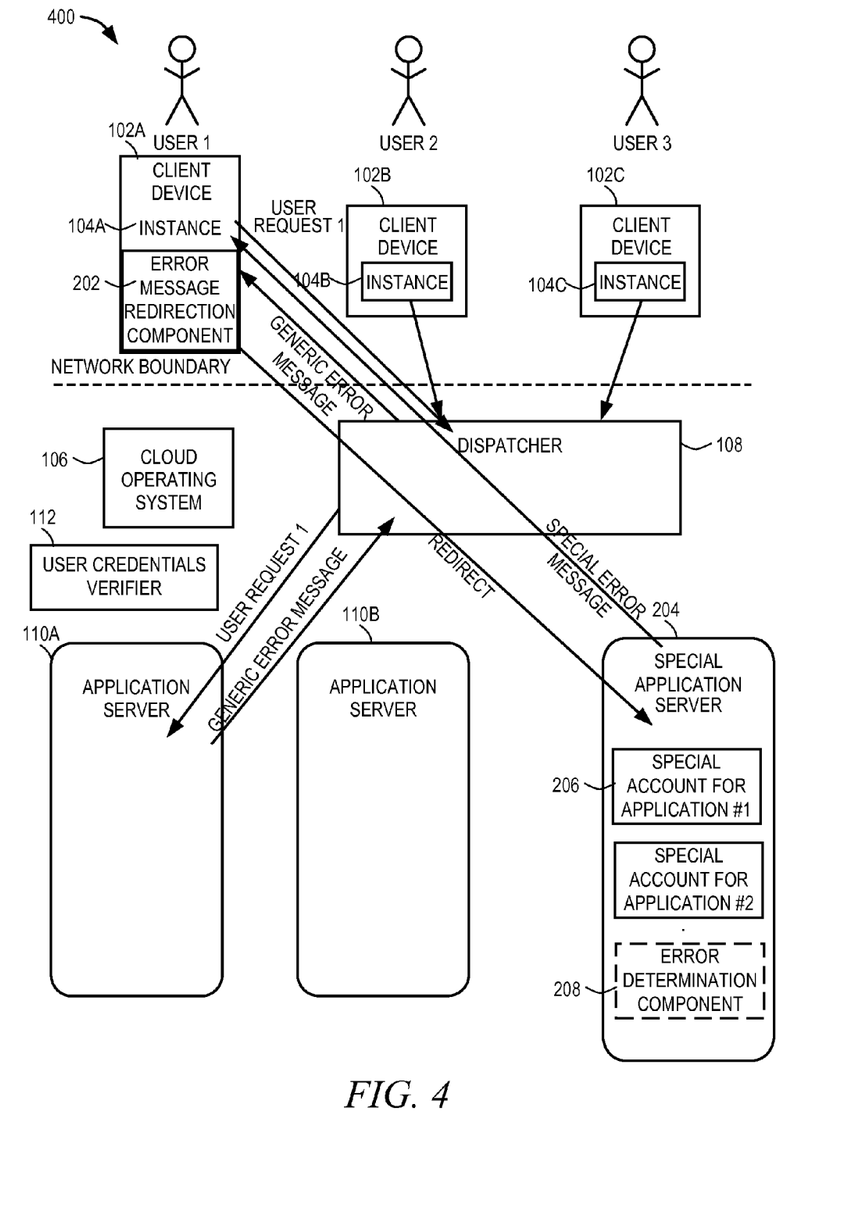
FIG. 4 is a block diagram illustrating modified system, in accordance with another example embodiment, for enabling cloud-based applications.

In some example embodiments, rather than a dispatcher 308 performing the redirection, the redirection occurs on the client device 201A-201C, such as in the instance 104A-104C or in a web browser. FIG. 4 is a block diagram illustrating a modified system 400, in accordance with another example embodiment, for enabling cloud-based applications. The modified system 400 is similar to system 100 of FIG. 2, except that the error message redirection component 202 is located in the client device 102A.

In this example embodiment, when a generic error message is generated by the application server 110A, the error message redirection component 202 intercepts the generic error message and redirects it to the special application server 204. This redirection may include whatever information that the error message redirection component 202 has regarding the generic error message, including, for example, information about the application server 110A that sent the generic error message, a uniform resource locator (URL) that was attempted to be accessed when the generic error message was sent, any metadata received with the error message, packet information sent with the generic error message, etc. Rather than this occurring at the dispatcher 108, however, as in FIG. 2, this occurs at the client device 102A.

At the special application server 204, the information sent with the redirection is used to identify the particular special account 206 to utilize, and then the appropriate special error message 322 is generated, as described above with respect to FIG. 2.

Figure 5:
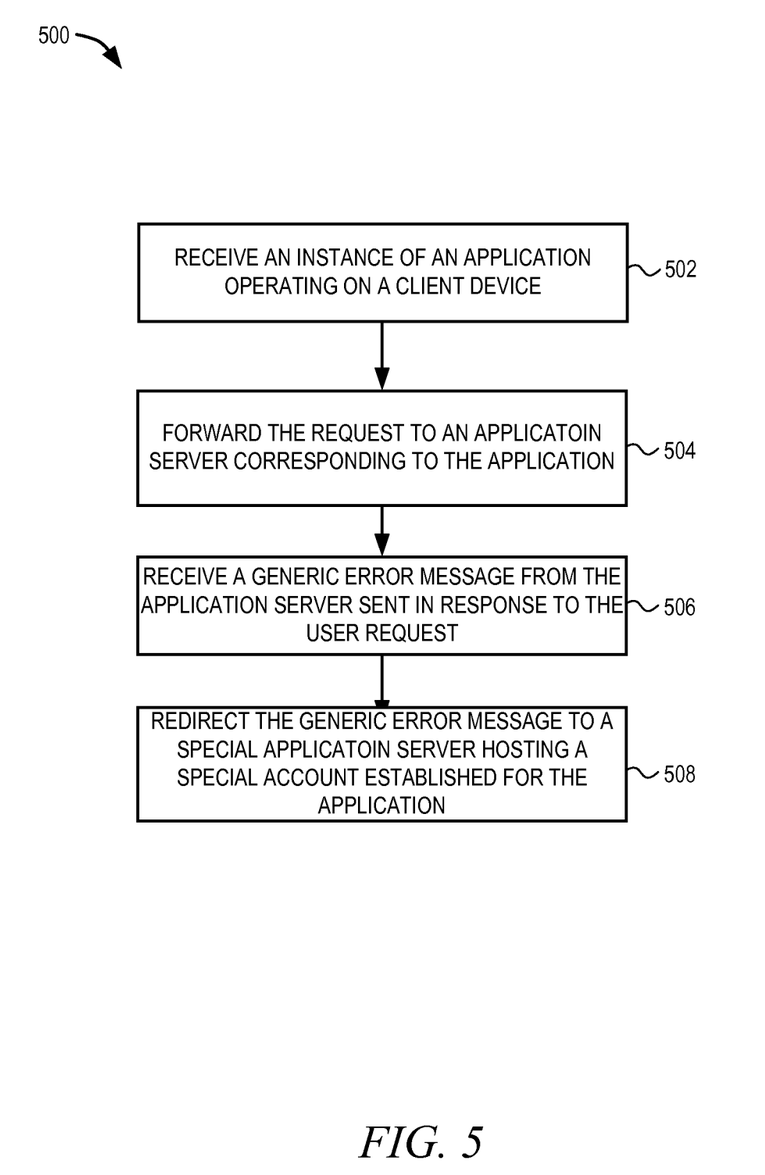
FIG. 5 is a flow diagram illustrating a method, in accordance with an example embodiment, of redirecting responses from an application server in a cloud environment.

FIG. 5 is a flow diagram illustrating a method 500, in accordance with an example embodiment, of redirecting responses 310 from an application server 110A-110B in a cloud environment. In some example embodiments, the method is performed at a dispatcher 108 in a cloud environment. In other example embodiments, the method is performed at a client device 102A-102C. At operation 502, a request 316 from an instance 104A-104C of an application operating on a client device 102A-102C is received. This request 316 may be a request 316 to perform a particular action within the application, the action being one that uses the application server 110A-110B to perform. For example, the action may be a navigation action taken in a user interface of the application which causes a request 316 for additional data to be generated and sent to the application server 110A-110B for fulfillment.

At operation 504, the request 316 is forwarded to an application server 110A-110B corresponding to the application. This may be performed by, for example, first identifying a list of possible application servers 110A-110B based on the application. There may be, for example, more than one application server 110A-110B devoted to an application, which can be used for redundancy and/or load balancing purposes. Once the possible application servers 110A-110B are identified, a dispatcher 108 may determine which of the possible application servers 110A-110B to which to forward the request 316. This may include, for example, using a load balancing algorithm to select an appropriate application server 110A-110B.

In some example embodiments, at this stage, an error message redirection component 202 that is performing the method 500 may begin to track information about the request 316 in order to include the information in future redirection. This tracking may begin, for example, at the detection of a cookie 312 in the request 316 that identifies a location of a special application server 204 for redirection. The error message redirection component 202 may receive and forward many requests 316 for many different application servers 110A-110B (and from many different client devices 102A-102C, if the error message redirection component 202 is located on a particular client device 102A as opposed to, for example, on a dispatcher 108 in the cloud). In light of this, the error message redirection component 202 may contain a mechanism to track which requests 316 are those that may have responses 310 requiring redirection and distinguish them from requests 316 that may have responses 310 that do not require redirection. A table accessible by the error message redirection component 202, for example, can be used to store identifiers for instances 104A-104C of applications whose requests 316 may have responses 310 requiring redirection. An identifier for an application may be added to the table upon receipt of the cookie 312 in a request 316 from an instance 104A-104C of the application. These identifiers may be included in the responses 310 themselves sent from the application servers 110A-110B. The error message redirection component 202 is then able to inspect responses 310 and compare identifiers in the responses 310 to the identifiers in the table to determine whether redirection is appropriate.

Once the application server 110A-110B receives the request 316, it may service the request 316 and generate a response 310. As described above, this response 310 may include an identifier of the application which can be seen by the error message redirection component 202. The response 310 may be a generic error message or some other type of response (e.g., a response 310 fulfilling the request 316). The method 500 is only concerned with generic error messages from application servers 110A-110B corresponding to applications identified in the table or otherwise indicated that whose responses 310 are subject to redirection.

At operation 506, a generic error message from the application server 110A-110B sent in response to the user request 316 is received. At operation 508, the generic error message is redirected to a special application server 204 hosting a special account 206 established for the application. The location of the special application server 204 may be obtained from the cookie 312. The special account 206 indicates one or more actions to take in response to receipt of a generic error message. The one or more actions cause generation of a special error message 322 and the sending of the special error message 322 to the instance 104A-1104C of the application operating on the client device 102A-102C. The redirection may include sending along any metadata about the generic error message sent from the application server 110A-110B along with the generic error message or any other information the error message redirection component 202 is aware of regarding the request 316, instance 104A-1104C of the application, application, or response 310 that may be helpful in the special application server 204 determining which special error message 322 to generate.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-5 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 6:
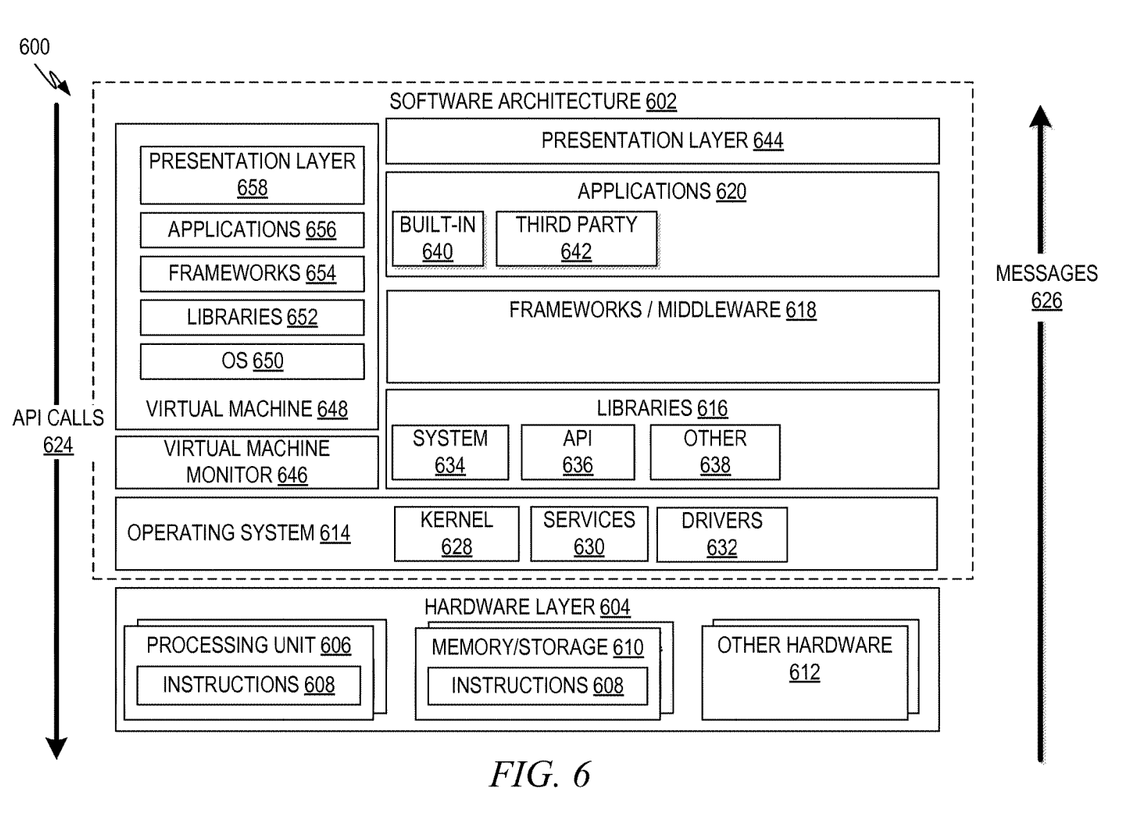
FIG. 6 is a block diagram illustrating a representative software architecture, which may be used in conjunction with various hardware architectures herein described.

FIG. 6 is a block diagram 600 illustrating a representative software architecture 602, which may be used in conjunction with various hardware architectures herein described. FIG. 6 is merely a non-limiting example of a software architecture 602 and it will be appreciated that many other architectures may be implemented to facilitate the functionality described herein. The software architecture 602 may be executing on hardware such as machine 700 of FIG. 7 that includes, among other things, processors 710, memory/storage 730, and I/O components 750. A representative hardware layer 604 is illustrated and can represent, for example, the machine 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 1-5. Hardware layer 604 also includes memory and/or storage modules 610, which also have executable instructions 608. Hardware layer 604 may also comprise other hardware 612 which represents any other hardware of the hardware layer 604, such as the other hardware illustrated as part of machine 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620 and presentation layer 644. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems may not provide a frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware 618 (also sometimes referred to as middleware) may provide a higher-level common infrastructure that may be utilized by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630 and/or drivers 632), libraries (e.g., system libraries 634, API libraries 636, and other libraries 638), frameworks/middleware 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware machine (such as the machine 700 of FIG. 7, for example). A virtual machine 648 is hosted by a host operating system (operating system 614 in FIG. 7) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and Machine-Readable Medium

Figure 7:
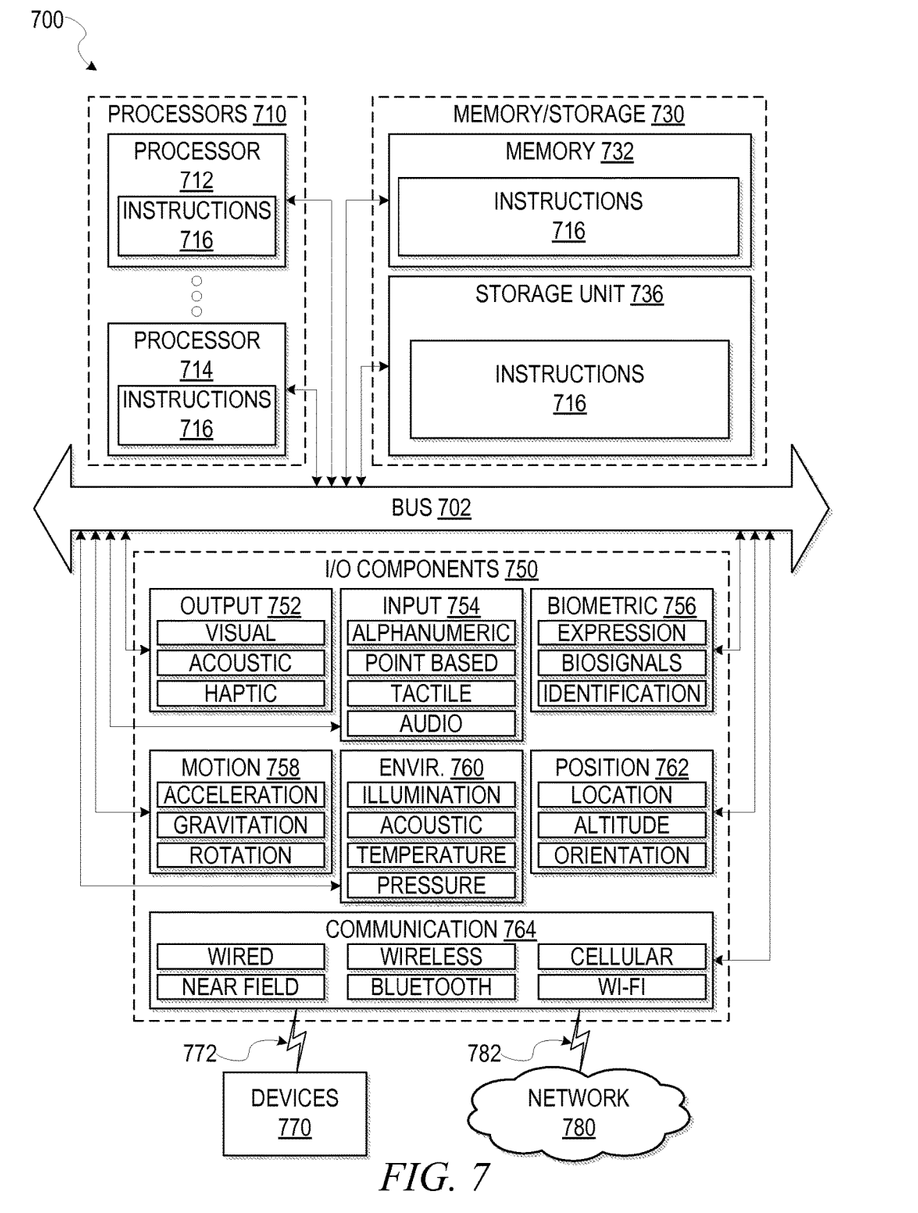
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 716 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the flow diagrams of FIGS. 1-5. Additionally, or alternatively, the instructions 716 may implement modules of FIGS. 1-5, and so forth. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 712 and processor 714 that may execute instructions 716. The term "processor" is intended to include multi-core processor 712, 714 that may comprise two or more independent processors 712, 714 (sometimes referred to as "cores") that may execute instructions 716 contemporaneously. Although FIG. 7 shows multiple processors 710, the machine 700 may include a single processor 712, 714 with a single core, a single processor 712, 714 with multiple cores (e.g., a multi-core processor 712, 714), multiple processors 712, 714 with a single core, multiple processors 712, 714 with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor 712, 714's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions 716 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of redirecting responses from an application server in a cloud environment, the method comprising:
   receiving, at a dispatcher computer, a request from an instance of an application operating on a client device;
   forwarding the request, at the dispatcher computer, to the application server corresponding to the application, wherein the request forwarded to the application server is the same request as was received from the instance of the application operating on the client device;
   intercepting, at the dispatcher computer, a generic error message from the application server sent directly in response to the request, and
   redirecting, at the dispatcher computer, the generic error message to alter a destination of the generic error message from the application server to a special application server, separate and distinct from the dispatcher computer and the application server, the special application server hosting a special account established for the application, the special account providing the application with personalized access to information stored for the special account, the information indicating one or more actions to take in response to receipt of the generic error message, the one or more actions causing generation of a special error message and sending of the special error message to the instance of the application operating on the client device.

2. The method of claim 1, wherein the dispatcher computer forms part of the client device.

3. The method of claim 1, wherein the request includes a cookie indicating a location for the application server and the forwarding utilizes the location in determining how to send the request.

4. The method of claim 3, wherein the cookie is generated by the application server.

5. The method of claim 1, further comprising receiving metadata from the application server along with the generic error message and sending the metadata to the special application server to be used in generating the special error message.

6. The method of claim 1, wherein the special account indicates one or more rules to execute to determine which of a plurality of possible special error messages should be generated, based upon information received in the redirection.

7. A system comprising:
   an error message redirection component executable by one or more processors and configured to:
   receive a request from an instance of an application operating on a client device;
   forward the request to an application server corresponding to the application, the request forwarded to the application server being the same request as was received from the instance of the application operating on the client device;
   intercept a generic error message from the application server sent directly in response to the request; and
   redirect the generic error message to alter a destination of the generic error message from the application server to a special application server, separate and distinct from the error message redirection component and the application server, the special application server hosting a special account established for the application, the special account providing the application with personalized access to information stored for the special account, the information indicating one or more actions to take in response to receipt of a generic error message, the one or more actions causing generation of a special error message and sending of the special error message to the instance of the application operating on the client device.

8. The system of claim 7, wherein the error message redirection component is located on the dispatcher computer in the cloud environment.

9. The system of claim 7, wherein the error message redirection component is located on the client device.

10. The system of claim 7, wherein the request includes a cookie indicating a location for the application server and the forwarding utilizes the location in determining how to send the request.

11. The system of claim 10, wherein the cookie is generated by the application server.

12. The system of claim 7, herein the error message redirection component is further configured to receive metadata from the application server along with the generic error message and send the metadata to the special application server to be used in generating the special error message.

13. The system of claim 7, wherein the special account indicates one or more rules to execute to determine which of a plurality of possible special error messages should be generated, based upon information received in the redirection.

14. A non-transitory computer-readable storage medium comprising instructions that, when executed by at least one processor of a machine, cause the machine to perform operations comprising:

receiving, at a dispatcher computer, a request from an instance of an application operating on a client device;

forwarding the request, at the dispatcher computer, to the application server corresponding to the application, wherein the request forwarded to the application server is the same request as was received from the instance of the application operating on the client device;

intercepting at the dispatcher computer, a generic error message from the application server sent directly in response to the request; and redirecting, at the dispatcher computer, the generic error message to alter a destination of the generic error message from the application server to a special application server, separate and distinct from the dispatcher computer and the application server, the special application server hosting a special account established for the application, the special account providing the application with personalized access to information stored for the special account, the information indicating one or more actions to take in response to receipt of the generic error message, the one or more actions causing generation of a special error message and sending of the special error message to the instance of the application operating on the client device.

15. The non-transitory computer-readable storage medium of claim 14, wherein the dispatcher computer is located on the client device.

16. The non-transitory computer-readable storage medium of claim 14, wherein the request includes a cookie indicating a location for the application server and the forwarding utilizes the location in determining how to send the request.

17. The non-transitory computer-readable storage medium of claim 16, wherein the cookie is generated by the application server.

18. The non-transitory computer-readable storage medium of claim 14, further comprising receiving metadata from the application server along with the generic error message and sending the metadata to the special application server to be used in generating the special error message.

* * * * *